J. C. CHAMBERS.
Insulated-Cresting.
No. 224,504.  Patented Feb. 10, 1880.
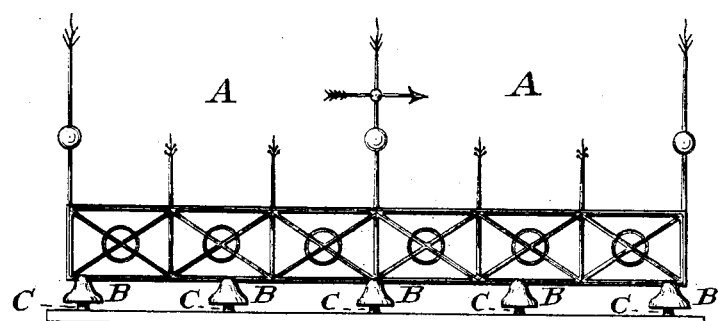

UNITED STATES PATENT OFFICE.

JOSEPHUS C. CHAMBERS, OF CINCINNATI, OHIO, ASSIGNOR TO THE CHAMBERS NATIONAL LIGHTNING PROTECTION COMPANY, OF SAME PLACE.

INSULATED CRESTING.

SPECIFICATION forming part of Letters Patent No. 224,504, dated February 10, 1880.

Application filed November 21, 1879.

*To all whom it may concern:*

Be it known that I, JOSEPHUS C. CHAMBERS, of Cincinnati, in the county of Hamilton and State of Ohio, have invented a new and useful Insulated Cresting for Buildings, of which the following is a specification.

The subject of my invention is a cresting provided with numerous points, but electrically insulated both from the earth and from the building to which it is applied, so as to prevent said points affording attraction to electricity, and thus inviting a stroke of lightning, as they do when electrically connected to the building in the ordinary way.

It is well known that all bodies of conducting material, when insulated, receive electricity by induction, and the electricity so evoked is opposite from that of the body by which it was induced, while a conductor receiving electricity by conduction receives the same kind as the body from which it was obtained. It will hence appear that a cresting insulated as above described will, on the approach of a thunder-cloud, receive electricity by the inductive influence of both the earth and the cloud acting in unison upon it, developing at the same moment a pair of poles on said cresting. Supposing the cloud to be positive, the upper parts or points of the cresting will be negative, while the base, which is next the house, will be positive, the house-top being negative by reason of electrical connection with the earth.

It is manifest that a cresting thus insulated will not offer any potent attraction to the electricity in the cloud; but I am further of the opinion, based on extensive and protracted observation of such insulated crestings and rods under the influence of atmospheric electricity, that a building which the insulated cresting surrounds or surmounts is less liable to receive a stroke of lightning than another building, tree, or elevated object, or than the surrounding ground itself.

The utility of my invention is not, however, dependent on this theory, which I believe to be correct, inasmuch as it is manifest that my insulated cresting does not afford or offer to a lightning-stroke the potent attraction which is offered by crestings having electrical connection with the building to which they are applied.

The mode of carrying my invention into effect will be understood by reference to the accompanying drawings, in which—

Figure 1 is a front view or façade of a cresting, A, mounted upon insulators B, of glass or other electrical non-conductor, which insulators are securely set upon or fastened to wooden standards C erected upon the building. Fig. 2 is a partly-sectioned elevation of the insulating support such as I prefer to employ, B being the glass or other insulator proper; C, the wooden standard; D, the iron straps by which it is attached to the building.

The insulator proper, B, is bell-formed in order to shed the rain, and has a screw-socket for secure attachment to the post. It has a summit-groove to receive and hold the horizontal portion of the cresting, and a circumferential groove for the engagement of wire employed to hold said portion in the summit-groove.

I claim as new and of my invention—

1. A metallic cresting electrically insulated both from the building and from the ground, substantially as set forth.

2. A system of upturned metallic points, united and supported by horizontal portions elevated from the building, and having complete electrical insulation both from the building and from the ground, substantially as set forth.

In testimony of which invention I hereunto set my hand.

JOSEPHUS C. CHAMBERS.

Attest:
 GEO. H. KNIGHT,
 J. L. LOGAN.